United States Patent [19]

Ishibashi et al.

[11] Patent Number: 5,317,392
[45] Date of Patent: May 31, 1994

[54] NOISE REDUCING DEVICE FOR UP-GOING SIGNALS IN BIDIRECTIONAL CATV SYSTEM

[75] Inventors: Ryouji Ishibashi; Naomasa Nishimoto, both of Tokyo, Japan

[73] Assignee: NEC Corporation, Tokyo, Japan

[21] Appl. No.: 812,687

[22] Filed: Dec. 23, 1991

[30] Foreign Application Priority Data

Dec. 26, 1990 [JP] Japan .................. 2-414016

[51] Int. Cl.⁵ .......................... H04B 3/32; H04H 1/02
[52] U.S. Cl. ........................... 348/6; 455/4.2; 455/5.1
[58] Field of Search ............. 455/3.1, 4.1, 4.2, 5.1, 455/6.2, 6.3, 6.1; 358/86, 181

[56] References Cited

U.S. PATENT DOCUMENTS 4,982,440  1/1991  Dufresne et al. ............... 455/4.1

FOREIGN PATENT DOCUMENTS 0161937  9/1984  Japan ............................ 358/86
0264023  10/1989  Japan ............................ 455/4.2

Primary Examiner—Reinhard J. Eisenzopf
Assistant Examiner—Chi Pham
Attorney, Agent, or Firm—Whitham & Marhoefer

[57] ABSTRACT

A device incorporated in a bidirectional CATV system for reducing noise introduced in an up-going channel at a subscriber station. A terminal unit and a protector perform monodirectional or bidirectional switching operations on the basis of a DC current which the terminal station selectively outputs.

4 Claims, 3 Drawing Sheets

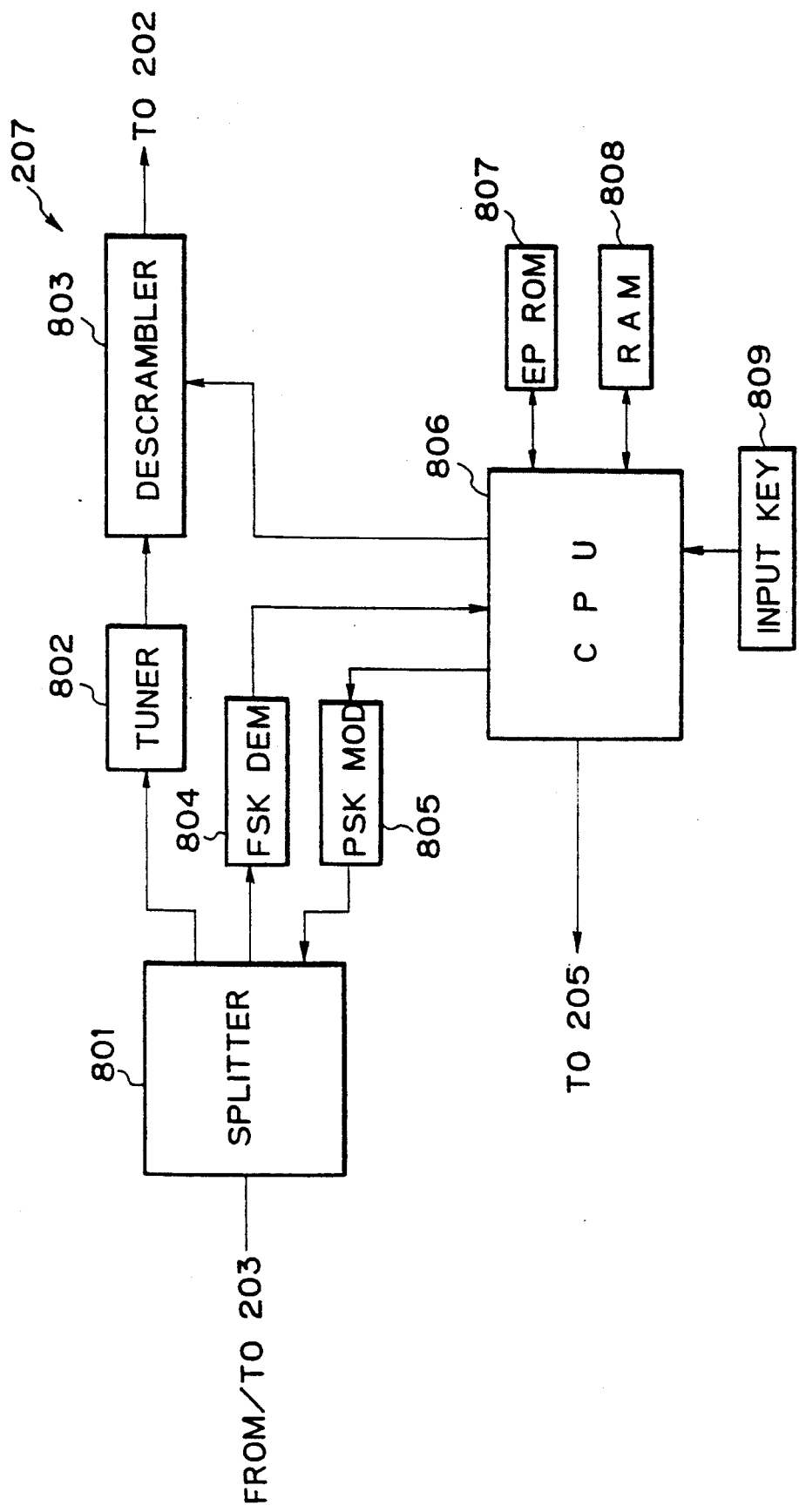

NOISE REDUCING DEVICE FOR UP-GOING SIGNALS IN BIDIRECTIONAL CATV SYSTEM

BACKGROUND OF THE INVENTION

The present invention relates to a device incorporated in a bidirectional CATV (Cable Television) system for reducing the noise of up-going signals and, more particularly, to a device for reducing the noise of up-going signals introduced at subscriber stations.

It is a common practice with a noise reducing device of the type described to cause the central station to turn on and off a line switch of a repeater every time noise is introduced in an up-going signal, since a down-going channel is constantly connected. The problem is, therefore, that the place where noise is introduced cannot be rapidly located, slowing down the recovery. Moreover, since the up-going signal is turned off by a repeater, the central station has to interrupt communication with a plurality of terminals even when noise is introduced at a single location. In addition, the control relying on a switch built in a repeater is not practicable without resorting to complicated and expensive circuitry.

SUMMARY OF THE INVENTION

It is, therefore, an object of the present invention to provide a simple noise reducing device for up-going signals in a CATV system which constantly reduces noise of up-going signals from subscriber stations without effecting the communication.

A noise reducing device for an up-going signal in a bidirectional CATV system of the present invention comprises a terminal unit capable of superposing a DC current on data only when the terminal unit sends an up-going signal, a high-pass filter circuit passing only a down-going signal, a bidirectional circuit passing both of an up-going signal and a down-going signal, and a switching circuit for selecting the high-pass filter circuit when the terminal unit does not output a DC current or selecting the bidirectional circuit by a DC current when the terminal unit outputs the DC current.

BRIEF DESCRIPTION OF THE DRAWINGS

The above and other objects, features and advantages of the present invention will become more apparent from the following detailed description taken with the accompanying drawings in which:

FIG. 3 is a block diagram schematically showing a specific construction of a communication control unit shown in FIG. 2.

DESCRIPTION OF THE PREFERRED EMBODIMENT

Figure 1:
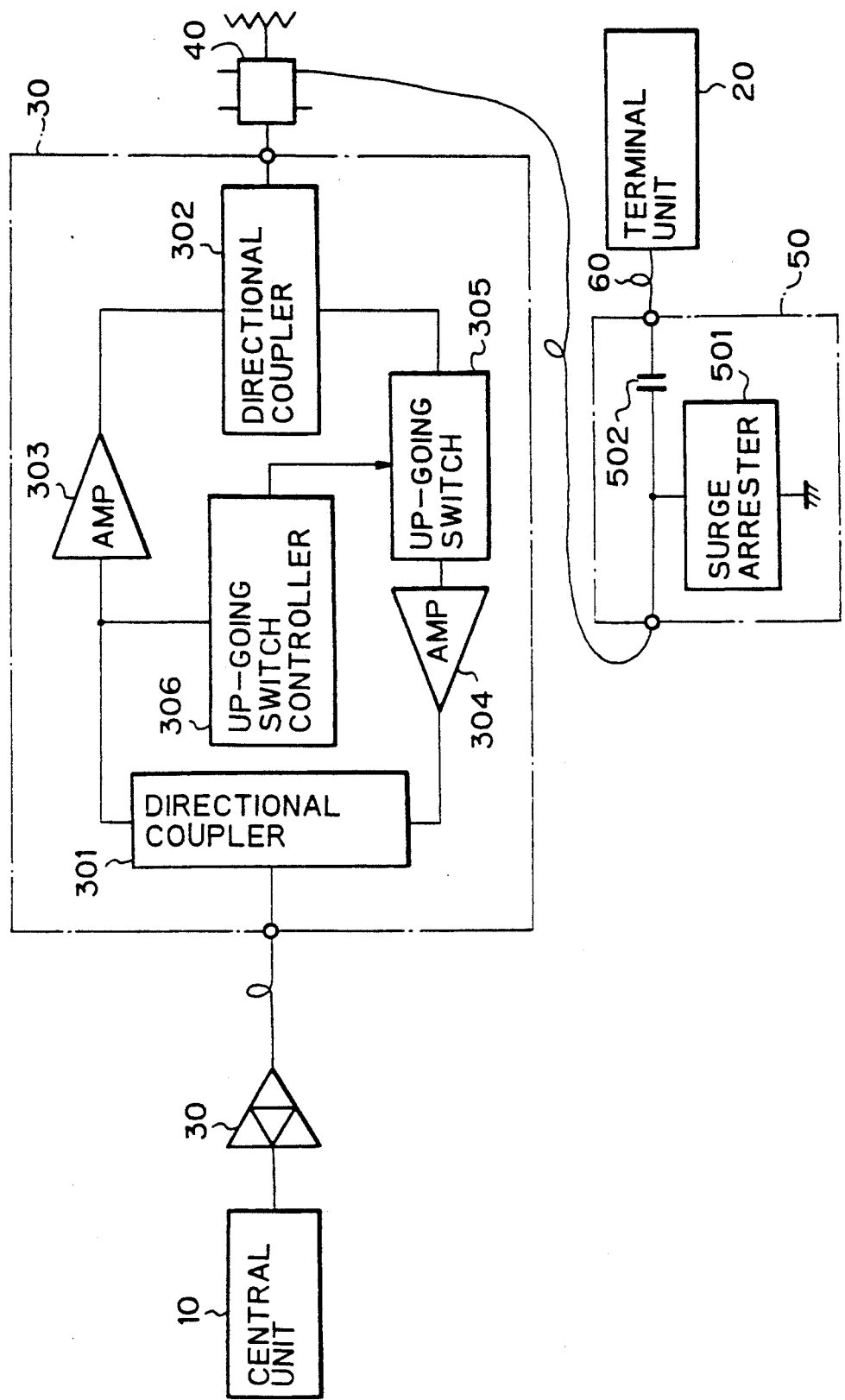
FIG. 1 is a block diagram schematically showing a conventional bidirectional CATV system.

To better understand the present invention, a brief reference will be made to a conventional bidirectional CATV system, shown in FIG. 1. As shown, the CATV system has a central unit 10 and a terminal or subscriber unit 20 which can hold bidirectional communication with each other. Intervening between the central unit 10 and the terminal unit 20 are a bidirectional repeater 30, a tap-off unit 40, and a bidirectional protector 50. The repeater 30 for controlling up-going signals is made up of a first and a second directional coupler 301 and 302, a down-going signal amplifier 303, an up-going signal amplifier 304, an up-going signal switch 305, and an up-going signal switch controller 306. The protector 50 has a surge arrester conductor 501 and a capacitor 502 and is connected to the terminal unit 20 by a subscriber cable 60. The central unit 10 sends a control signal for controlling the up-going signal switch 305 to the repeater 30 by use of a down-going frequency band. The control signal reaching the repeater 30 is routed through the first directional coupler 301 to the up-going signal switch controller 306, whereby the switch 305 is on/off controlled. In this configuration, a down-going signal is constantly sent to the terminal unit 20 while the switch 305 of the repeater 30 is turned on and off to reduce noise included in an up-going signal, as needed.

However, in the conventional system, the central unit 10 has to turn on and off the repeater 30 every time noise is introduced in the up-going signal, since the up-going channel is constantly connected. This prevents a place where noise is introduced from being rapidly located, slowing down the recovery. Moreover, since the up-going signal is turned off by the repeater 30, the central unit 10 has to interrupt communication with a plurality of terminal units 20 even when noise is introduced at a single location.

Figure 2:
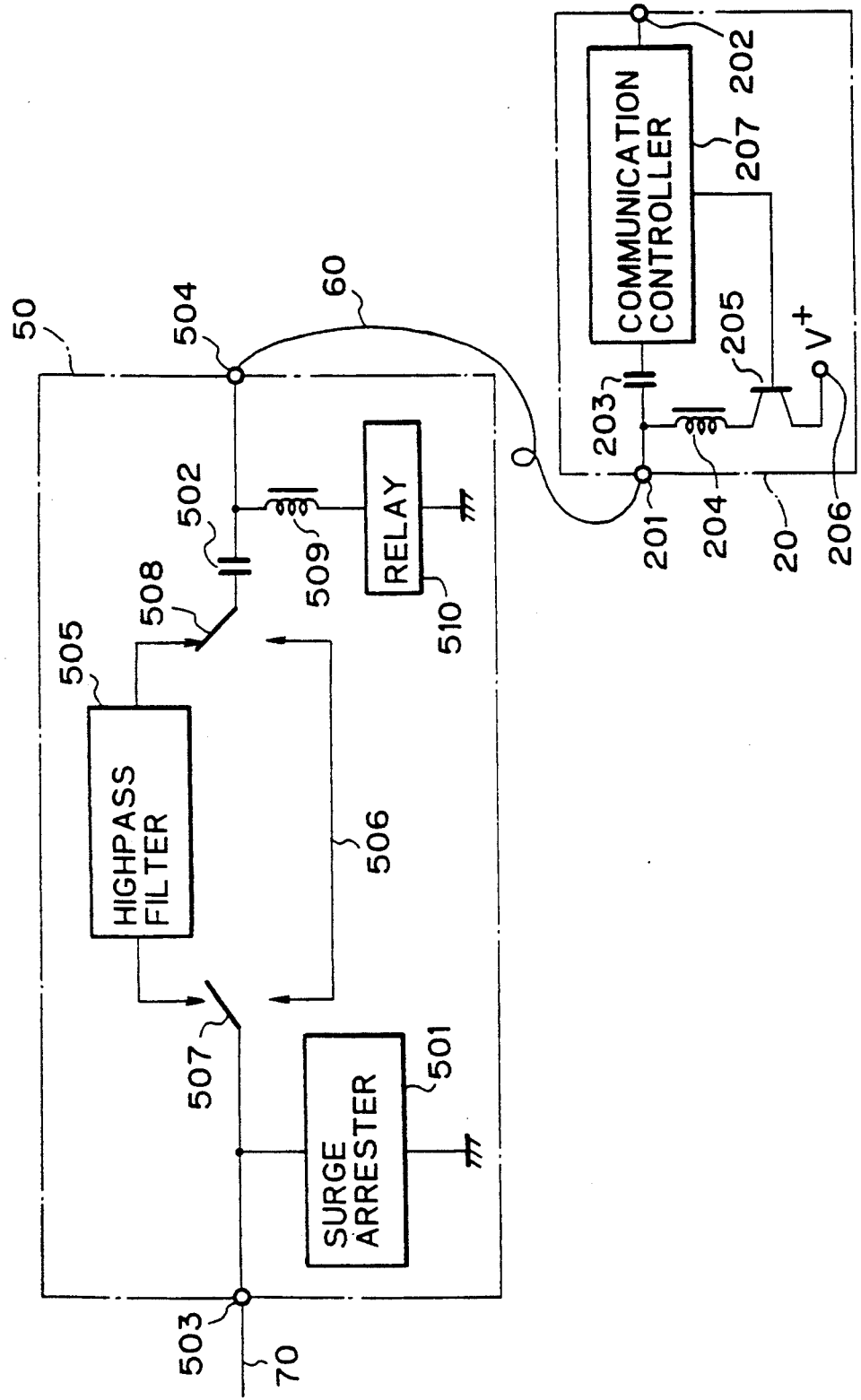
FIG. 2 is a block diagram schematically showing a noise reducing device embodying the present invention.

Referring to FIG. 2, a noise reducing device embodying the present invention is shown. In the figures, the same or similar components are designated by the same reference numerals, and redundant description will be avoided for simplicity. As shown, the noise reducing device has a protector 50 which has an input terminal 503 connected to a pull-in line 70 and an output terminal 504 connected to a subsciber cable 60. Connected between the terminals 503 and 504 are a lightning conductor 501, a capacitor 502, a 70 MHz high-pass filter 505, a strap line 506, a first and a second relay contact 507 and 508 operable in synchronism with each other, a choke coil 509, and a relay coil 510. The capacitor 502 blocks a DC current from the output terminal 504, i.e., passes only signals.

A terminal unit 20 has an input/output terminal 201 connected to the subscriber cable 60, and a video output terminal 202. The terminal unit 20 further has a capacitor 203, a choke coil 204, a switching device in the form of a transistor 205, a DC power source terminal 206, and a communication controller 207. The transistor 205 is driven by the communication controller 207. As the transistor 205 is turned on and off, a DC current from the power source terminal 206 is selectively applied to the protector 50 via the choke coil 204. As shown in FIG. 3, the communication controller 207 has a splitter 801, a tuner 802, a descrambler 803, a frequency shift keying demodulator (FSK DEM) 804, a phase shift keying demodulator (PSK DEM) 805, a CPU (Central Processing Unit) 806, an EPROM (Erasable Programmable Read Only Memory) 807, a RAM (Random Access Memory) 808, and input keys 809.

The operation of the embodiment will be described with reference to FIG. 2 which shows a condition wherein the terminal unit 20 is not sending an up-going signal. To send an up-going signal, the communication controller 207 turns on the transistor 205 to thereby drive the relay 510 included in the protector 50. As a result, the relay contacts 507 and 508 are switched over to the strap line 506 to set up an up-going channel. Such a state is maintained as long as an up-going signal is sent. On the stop of the up-going signal, the communication controller 207 turns off the transistor 205 to interrupt the DC current, thereby resetting the relay 510. Consequently, the relay contacts 507 and 508 are switched over to the high-pass filter 505, setting up only the down-going channel.

In FIG. 3, data and a video signal are applied to the splitter 801 from the subscriber cable 60 via the capacitor 203. The split data is demodulated by the FSK DEM 804 and then applied to the CPU 806. If the video signal is scrambled, the descrambler 803 descrambles the video signal of the program and the video signal is outputted via the terminal 202. On the other hand, when data is entered on the input keys 809, the CPU 806 processes it and then delivers the resulting data to the PSK MOD 805. Modulated data from the PSK MOD 805 is sent over the subscriber cable 60. Before the PSK MOD 805 outputs the data, the transistor 205 is turned on to superpose the DC current on the data. The transistor 205 is turned off after the data has been sent from the PSK MOD 805. The procedure described above is executed by the CPU 806 according to programs stored in the EPROM 807.

In summary, in accordance with the present invention, a terminal unit and a protector perform monodirectional or bidirectional switching operations on the basis of whether or not a DC current from the terminal station is present. Hence, the present invention constantly reduces noise of an up-going signal with simple circuitry and without interrupting the communication with terminal units other than the terminal unit of interest.

Various modifications will become possible for those skilled in the art after receiving the teachings of the present disclosure without departing from the scope thereof.

What is claimed is:

1. In a CATV system of the type having a central unit interconnected with a terminal unit, a noise reducing device for an up-going signal from the terminal unit to the central unit comprising:

controller means at the terminal unit for superposing a DC current on an up-going signal only when said terminal unit sends an up-going signal to the central unit;

high-pass filter means connected between the central unit and the terminal unit and passing only a down-going signal from the central unit to the terminal unit;

bidirectional circuit means paralleling the high-pass filter means and passing both of an up-going signal and a down-going signal; and switching means responsive to the DC current from the controller means for selecting said high-pass filter means when said controller means does not output a DC current or selecting said bidirectional circuit means when said controller means outputs said DC current.

2. A device as claimed in claim 1, wherein said high-pass filter means, said bidirectional circuit means and said switching means constitute a protector.

3. A device as claimed in claim 1, wherein said controller means comprises communication controller and a switch which is on/off controlled by said communication controller to selectively turn on or off a DC current.

4. A device as claimed in claim 1, wherein said switching means comprises a relay circuit operated by a DC current.

* * * * *